United States Patent Office 3,209,040
Patented Sept. 28, 1965

3,209,040
PROCESS FOR THE TREATMENT OF CHLORINATED HYDROCARBONS
Nestor Daras, Ixelles-Brussels, and André Ryckaert, Uccle-Brussels, Belgium, assignors to Solvay & Cie, Brussels, Belgium, a Belgian company
No Drawing. Filed Sept. 11, 1962, Ser. No. 222,962
Claims priority, application Netherlands, Sept. 15, 1961, 296,306
6 Claims. (Cl. 260—654)

The present invention concerns a process for purifying chlorinated hydrocarbons from their oxidation products, particularly trichlorethylene and perchlorethylene, and the purified hydrocarbons obtained by this process.

It is known that under the action of oxygen, chlorinated hydrocarbons, particularly trichlorethylene and perchlorethylene, undergo a certain amount of decomposition which is catalysed by various agents such as light, heat and certain metallic salts, for example those of iron. The oxidation products thus formed themselves exert an auto-catalytic effect on the velocity of the decomposition process. This is the reason why it is now the current practice to add stabilisers to the said chlorinated hydrocarbons to prevent their decomposition or to fix the decomposition products. Certain oxidation products of chlorinated hydrocarbons can react with the usual stabilisers for chlorinated hydrocarbons, thus prejudicing the effectiveness of the said stabilisers. It is thus necessary to eliminate these oxidation products before adding the stabilisers.

While certain of these products, among others hydrogen chloride, phosgene, chloral, and the chlorides of di- or tri-chloracetyl, are easily extracted by washing with water or with an alkaline solution at ambient temperature, others on the other hand, notably the epoxides of trichlorethylene and perchlorethylene, resist such treatment and are only hydrolysed at a very low rate, even by alkaline solutions at boiling temperature.

An object of the present invention is a process of purification which permits the elimination and/or neutralisation of substantially all the oxidation products contained in the chlorinated hydrocarbons. Other objects will appear from the following.

The applicants have now found that these oxidation products can be eliminated and or neutralised by esterifying them by means of an aqueous solution of a polyol.

Thus the process forming the object of the invention consists in esterifying the oxidation products of the chlorinated hydrocarbons such trichlorethylene and perchlorethylene by putting them in intimate contact with an aqueous solution of a polyol at a temperature between 20 and 110° C., cooling the mixture thus obtained to a temperature such that the content of water dissolved in the chlorinated hydrocarbons is appreciably reduced, separating the aqueous phase from the organic phase and recovering the purified chlorinated hydrocarbon substantially dry. The applicants have made the surprising discovery that the esterification of the oxidation products contained in the chlorinated hydrocarbons, by means of a polyol, is carried out more easily than the hydrolysis at the same temperature, It leads to the formation of esters which are unobjectionable in respect of the stability of the chlorinated hydrocarbons and hydrogen chloride; if aqueous solutions of polyols are used, the hydrogen chloride is readily eliminated by passing into the aqueous phase. The best results are obtained by operating at a temperature between 50 and 80° C.

After the separation of the aqueous phase, if the chlorinated hydrocarbons recovered are free from injurious oxidation products, they must nevertheless be freed from water dissolved therein in the course of the esterification. This result could be achieved by cooling the chlorinated hydrocarbon up to the temperature corresponding to the desired saturation with water, then removing the aqueous phase which separates.

The applicants have found that by cooling the chlorinated hydrocarbons in contact with the solutions of polyols at temperatures of the order of 20 to −10° C., the content of water dissolved in the purified chlorinated hydrocarbon recovered after elimination of the aqueous phase, is lower than that corresponding to saturation in water at that temperature. Thus, in cooling to 5 or 0° C., for example, a hydrocarbon is obtained of which the water content corresponds to saturation at −5 or −10° C., that is to say to contents generally admissible in commercial products. This shift of the temperature clearly evidences the existence of a pronounced drying effect due to the polyols.

The polyols employed must be very slightly soluble in the chlorinated hydrocarbons; glycols and glycerol are particularly suitable in this respect.

As certain oxidation products are particularly resistant to hydrolysis and to esterification, the applicants have found that it is especially advantageous to use an alkaline aqueous solution of glycol or glycerol.

In the examples referred to in Table I below, the contents of oxidation products are expressed in % HCl liberatable by complete esterification. After esterification, the mixtures are brought back to room temperature and the aqueous phase is separated by decantation. In the course of the treatment, the volumes of chlorinated hydrocarbon and of aqueous solution used are equal.

*Table 1*

| Hydrocarbon treated | Initial content of oxidation products, percent HCl | Washing solution | Duration of mixing, mins. | Temp., °C. | Final content of oxidation products, percent HCl |
|---|---|---|---|---|---|
| Trichlorethylene | 0.00125 | Water | 30 | 20 | 0.00070 |
|  | 0.00125 | ----do---- | 15 | 60 | 0.00050 |
|  | 0.00125 | ----do---- | 30 | 60 | 0.00020 |
|  | 0.00108 | Glycol, 30% by weight | 30 | 20 | 0.00030 |
|  | 0.00125 | ----do---- | 15 | 60 | 0.00010 |
|  | 0.00125 | ----do---- | 30 | 60 | 0.00000 |
|  | 0.00125 | Glycerol, 40% by weight | 15 | 60 | 0.00020 |
|  | 0.00125 | ----do---- | 30 | 60 | 0.00000 |
| Perchlorethylene | 0.00310 | Water | 30 | 20 | 0.00247 |
|  | 0.00310 | ----do---- | 30 | 80 | 0.00230 |
|  | 0.00203 | Glycol, 30% by weight | 30 | 20 | 0.00180 |
|  | 0.00158 | ----do---- | 30 | 80 | 0.00054 |
|  | 0.00225 | N/2 NH$_4$OH | 30 | 80 | 0.00090 |
|  | 0.00225 | (Glycol, 30% by weight N/2 NH$_4$OH). | 30 | 80 | 0.00036 |
|  | 0.00225 | N/2 NH$_4$OH | 60 | 80 | 0.00040 |
|  | 0.00225 | (Glycol, 30% by weight N/2 NHO$_4$H). | 60 | 80 | 0.00000 |

Table 1 permits comparison of the evolution of the oxidation products in the samples of trichlorethylene and perchlorethylene treated on one hand by water and on the other hand by aqueous solutions of glycol and glycerol.

The samples of trichlorethylene and perchlorethylene are treated with aqueous solutions of glycol and glycerol at the respective temperatures of 60° and 80° C. to eliminate the oxidation products. The mixtures are then cooled to the temperatures indicated in Table 2 below. The final water contents of the hydrocarbons, after separation of the aqueous phase in the cold, are determined by the Karl Fischer method.

Table 2

TRICHLORETHYLENE

| Initial water content, mg./kg. | Polyalcohols | | Cooling Tempera- ture, ° C. | Final Water Content, mg./kg. | Corresponding Saturation Temperature, ° C.[1] |
|---|---|---|---|---|---|
| | Type | Percent by weight Concentn. | | | |
| 720 | | 30 | −10 | 58 | −12 |
| 352 | | 80 | −10 | 39 | −20 |
| 720 | Glycol | 30 | 0 | 82 | −4 |
| 352 | | 80 | 0 | 58 | −12 |
| 352 | | 80 | +20 | 98 | 0 |
| 696 | | 40 | −10 | 53 | −14 |
| 400 | | 80 | −10 | 40 | −20 |
| 696 | Glycerol | 40 | 0 | 82 | −4 |
| 400 | | 80 | 0 | 68 | −7 |
| 400 | | 80 | +20 | 130 | +6 |

PERCHLORETHYLENE

| | | | | | |
|---|---|---|---|---|---|
| 198 | | 80 | −10 | 10 | −24 |
| 380 | Glycol | 40 | 0 | 20 | −11 |
| 198 | | 80 | 0 | 15 | −17 |
| 198 | | 80 | +20 | 20 | −11 |
| 390 | | 40 | 0 | 23 | −8 |
| 225 | Glycerol | 80 | 0 | 18 | −13 |
| 390 | | 40 | +20 | 41 | +2 |
| 225 | | 80 | +20 | 28 | −5 |

[1] MacGovern, Ind. Eng. Chem. (1943) p. 1236.

As the weight proportions of water and oxidation products in the chlorinated hydrocarbons submitted to treatment are in general very small, the polyol solutions can be used for a long time without having to be regenerated. Their regeneration can be brought about by any method known as such.

We claim:

1. A process for treating a chlorinated hydrocarbon which comprises intimately mixing a chlorinated hydrocarbon containing epoxide thereof with an aqueous solution of a polyol selected from the group consisting of glycol and glycerol at a temperature of about 20° C. to 100° C. to esterify said epoxide, said chlorinated hydrocarbon being selected from the group which consists of trichloroethylene and perchloroethylene, cooling the mixture thus-obtained to a temperature below that of said mixing step, to a temperature of the order of −10° C. to 20° C., so that the content of water dissolved in the chlorinated hydrocarbon is appreciablly reduced, separating the aqueous phase from the organic phase, and recovering the chlorinated hydrocarbon substantially dry.

2. A process according to claim 1 wherein said aqueous polyol solution is mixed with said chlorinated hydrocarbon at a temperature of about 50° C. to 80° C.

3. A process according to claim 1 wherein said polyol is glycol.

4. A process according to claim 1 wherein said polyol is glycerol.

5. A process for treating a chlorinated hydrocarbon which comprises intimately mixing a chlorinated hydrocarbon containing epoxide thereof with a solution which consists essentially of a polyol selected from the group consisting of glycol and glycerol and water at a temperature of about 50° C. and 100° C., said chlorinated hydrocarbon being selected from the group which consists of trichlorethylene and perchloroethylene, cooling the thus-obtained mixture to a temperature not exceeding about 20° C. so that the content of water dissolved in the chlorinated hydrocarbon is appreciably reduced, separating the aqueous phase from the organic phase, and recovering the chlorinated hydrocarbon substantially dry.

6. A process according to claim 5, wherein said esterification is carried out at a temperature between 60° C. and 80° C. and said mixture is cooled to a temperature between 20° C. and −10° C.

References Cited by the Examiner

UNITED STATES PATENTS

| 2,160,632 | 5/39 | Yabroff et al. | 260—652 X |
| 2,186,398 | 1/40 | Yabroff | 260—652 X |
| 2,212,107 | 8/40 | Yabroff | 260—652 X |
| 2,495,440 | 1/50 | Britton et al. | 60—478 |

OTHER REFERENCES

Wagner et al., Synthetic Organic Chemistry, Wiley and Sons (New York, 1953), pp. 480–482.

LEON ZITVER, *Primary Examiner.*